US011487260B2

(12) United States Patent
Gopisetti et al.

(10) Patent No.: US 11,487,260 B2
(45) Date of Patent: Nov. 1, 2022

(54) SYSTEM AND METHOD FOR DYNAMICALLY SCALABLE SOFT HART MODEMS

(71) Applicant: Honeywell International Inc., Morris Plains, NJ (US)

(72) Inventors: Santosh Gopisetti, Hyderabad (IN); Sharath Babu Malve, Rangareddy District (IN); Siva Sagar Kuricheti, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 184 days.

(21) Appl. No.: 16/009,060

(22) Filed: Jun. 14, 2018

(65) Prior Publication Data

US 2019/0384249 A1    Dec. 19, 2019

(51) Int. Cl.
*G05B 19/042*  (2006.01)
*G05B 19/04*   (2006.01)
*G05B 19/05*   (2006.01)

(52) U.S. Cl.
CPC ....... *G05B 19/0425* (2013.01); *G05B 19/041* (2013.01); *G05B 19/05* (2013.01); *G05B 2219/24215* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 9,203,665 B1 * | 12/2015 | Haran | H04L 25/40 |
| 2004/0148135 A1 | 7/2004 | Balakrishnan et al. | |
| 2007/0280287 A1 | 12/2007 | Samudrala et al. | |
| 2018/0013857 A1 | 1/2018 | Pasala et al. | |
| 2018/0109403 A1 * | 4/2018 | Haran | H04L 1/206 |

* cited by examiner

*Primary Examiner* — Mohammad Ali
*Assistant Examiner* — Saad M Kabir
(74) *Attorney, Agent, or Firm* — Ortiz & Lopez, PLLC; Kermit D. Lopez; Luis M. Ortiz (57) ABSTRACT

A method and apparatus for managing a field device on a network can involve detecting, at a processing device, a connection of the field device in an industrial process control and automation system, receiving data, from the field device, including payload information related to the field device in the industrial process control and automation system, determining, at the processing device, whether the field device uses a specific protocol based on the data, and responsive to determining that the field device uses the specific protocol, generating, at the processing device, a soft modem instance. The method and apparatus can also involve termination of soft modem instance if the field device becomes disconnected. The method and apparatus can also involve demodulating and extracting, using the soft modem instance, the payload information from the data.

20 Claims, 4 Drawing Sheets

SYSTEM AND METHOD FOR DYNAMICALLY SCALABLE SOFT HART MODEMS

TECHNICAL FIELD

Embodiments relate generally to Highway Addressable Remote Transducer (HART) modems. More specifically, embodiments relate to methods and systems to provide for dynamically scalable soft HART modems in plant control and monitoring field devices.

BACKGROUND

A majority of the industrial devices (I/O (input/output), recorders) supporting HART need to have separate HART modems or time multiplex the HART modem to extract HART data from multiple field transmitters. Having multiple modems increases cost (HART modem per channel) or latency (HART modem in time-division multiple access (TDMA)).

Currently, a number of channels connected to internal HART modem of the I/O card is restricted. This restriction prevents a user from collecting data from multiple HART devices in parallel. Having multiple HART modems to support multichannel I/O devices involves high design, development, and product costs. Having a single HART modem to support multichannel I/O devices poses a restriction that the HART devices connected cannot be accessed in parallel. Restrictions on parallel device configuration in asset management systems delay project commissioning activities.

SUMMARY

Embodiments provide methods and systems for a dynamically scalable soft HART modems in plant control and monitoring field devices.

An embodiment provides a method for managing a field device on a network. The method includes detecting, at a processing device, a connection of the field device in an industrial process control and automation system. The method also includes receiving data, from the field device, including payload information related to the field device in the industrial process control and automation system. The method also includes determining, at the processing device, whether the field device uses a specific protocol based on the data. The method also includes responsive to determining that the field device uses the specific protocol, generating, at the processing device, a soft modem instance. The method also includes demodulating and extracting, using the soft modem instance, the payload information from the data.

Another embodiment provides a system that includes a memory and at least one processor. The memory is configured to store data. The at least one processor is configured to detect a connection of a field device in an industrial process control and automation system. The at least one processor is further configured to receive the data, from the field device, including payload information related to the field device in the industrial process control and automation system. The at least one processor is further configured to determine whether the field device uses a specific protocol based on the data. The at least one processor is further configured to responsive to determining that the field device uses the specific protocol, generate a soft modem instance. The at least one processor is further configured to demodulate and extract, using the soft modem instance, the payload information from the data.

Yet another embodiment provides a non-transitory computer readable medium containing instructions that, when executed by at least one processing device, cause the at least one processing device to detect, at the processing device, a connection of a field device in an industrial process control and automation system. The instructions further cause the at least one processing device to receive data, from the field device, including payload information related to the field device in the industrial process control and automation system. The instructions further cause the at least one processing device to determine, at the processing device, whether the field device uses a specific protocol based on the data. The instructions further cause the at least one processing device to responsive to determining that the field device uses the specific protocol, generate, at the processing device, a soft modem instance. The instructions further cause the at least one processing device to demodulate and extract, using the soft modem instance, the payload information from the data.

Other technical features may be readily apparent to one skilled in the art from the following figures, descriptions, and claims.

BRIEF DESCRIPTION OF THE DRAWINGS

For a more complete understanding of the embodiments, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
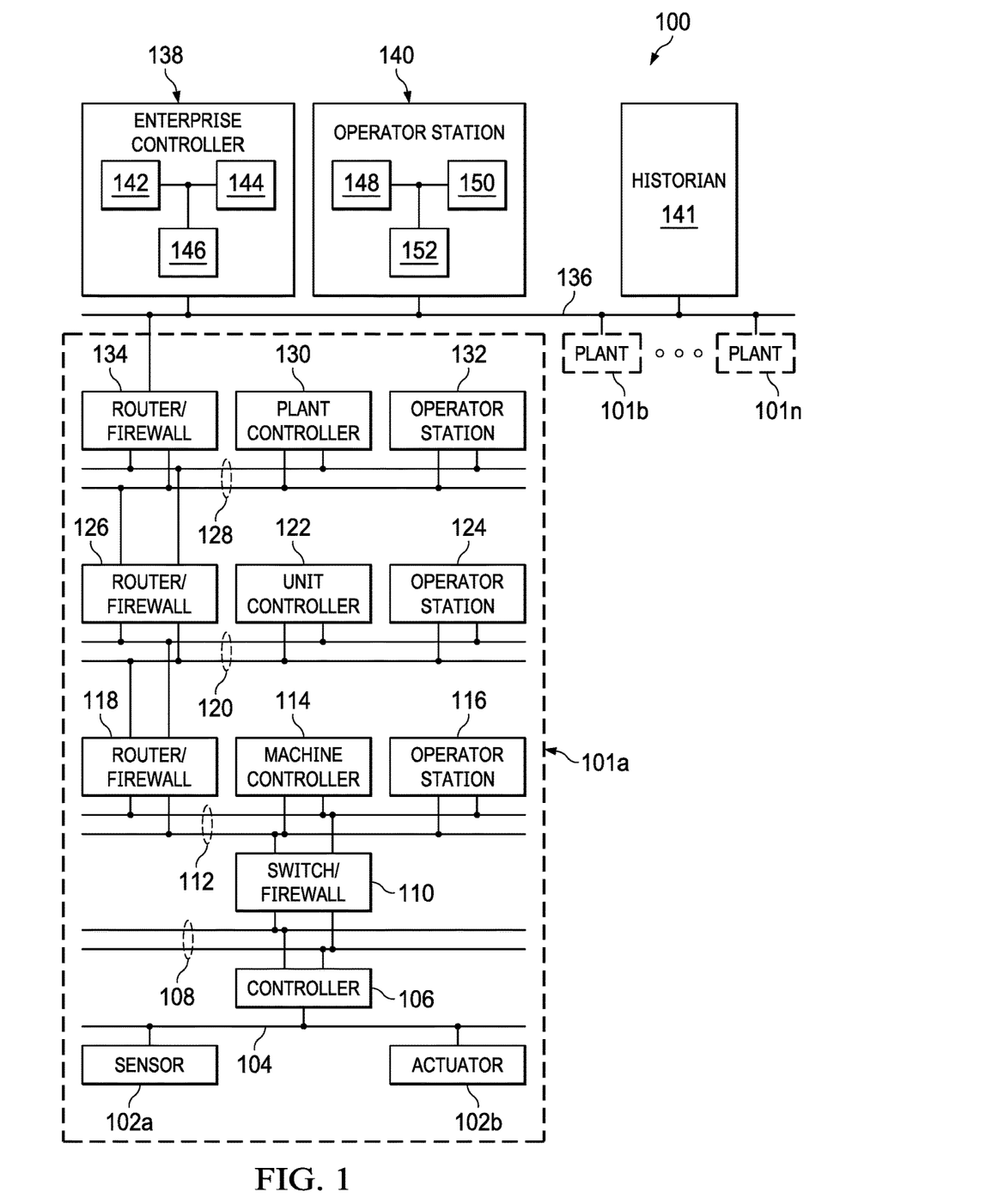
FIG. 1 illustrates an example industrial process control and automation system in accordance with an embodiment.

FIG. 1 illustrates an example industrial process control and automation system 100 according to an embodiment. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

The various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In particular embodiments, soft HART modem instances in a controller 106 are utilized to read the HART data from HART channels received from sensor 102a or actuator 102b. Sensor 102a and actuator 102b may each include transmitters capable of communicating over a 2 wire, 3 wire, or 4 wire electrical signal network. Soft HART modem instances can be virtual or software/firmware based modems to modulate and/or demodulate data in the HART protocol.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs.

Further, particular functions have been described as being performed by particular components of the system 100. This is for illustration only. In general, control and automation systems are highly configurable and can be configured in any suitable manner according to particular needs.

Figure 2:
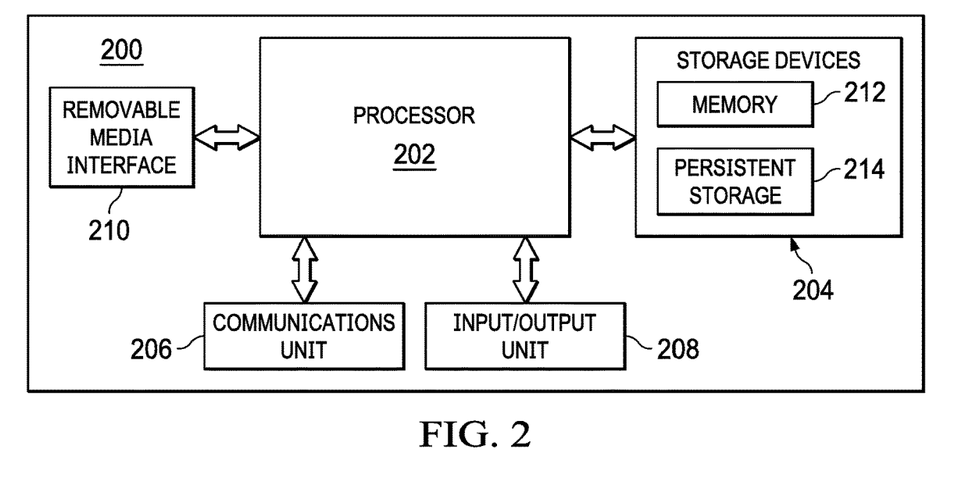
FIG. 2 illustrates an example device supporting soft HART instances, in accordance with an embodiment.

FIG. 2 illustrates an example device 200 supporting soft HART instances according to an embodiment. The device 200 could, for example, represent the controller 106 of FIG. 1. However, the device 200 could be used in any other suitable system.

As shown in FIG. 2, the device 200 includes at least one processor 202, at least one storage device 204, at least one communications unit 206, at least one input/output (I/O) unit 208, and at least one removable media interface 210. Each processor 202 can execute instructions, such as those that may be loaded into a memory 212. Each processor 202 denotes any suitable processing device, such as one or more microprocessors, microcontrollers, digital signal processors, application specific integrated circuits (ASICs), field programmable gate arrays (FPGAs), or discrete circuitry.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc. In accordance with an embodiment, the memory 212 and persistent storage 214 may be configured to store information and data associated with HART data.

The communications unit 206 supports communications with other systems or devices. For example, the communications unit 206 could include a network interface card or a wireless transceiver facilitating communications over a wired or wireless network (such as any of the networks 104, 108, 112, 120, 128, 136). The communications unit 206 may support communications through any suitable physical or wireless communication link(s). The communications unit 206 may include an input/output (I/O) device with a multi-channel unit and an analog-digital converter (ADC). The communications unit 206 may also include one or more modems for communication with the devices.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable media interface 210 denotes a structure to which a storage device can be coupled. For example, the device 200 could include one or more USB slots, Secure Digital High Capacity (SDHC) or other Flash memory slots, or other interfaces for coupling to storage devices. Depending on the implementation, the device 200 could include a single removable media interface 210, multiple removable media interfaces 210 of the same type or of different types, or no interfaces 210.

Although FIG. 2 illustrates one example of a device 200 supporting soft HART instances, various changes may be made to FIG. 2. For example, various components in FIG. 2 could be combined, further subdivided, or omitted and additional components could be added according to particular needs. Also, computing devices can come in a wide variety of configurations, and FIG. 2 does not limit the embodiments to any particular configuration of computing device.

One or more embodiments recognize and take into account that with a multiplexed modem where each HART modem caters the requests from a group of channels, there is a limitation in the number of channels that can be used in parallel, slow communication speeds, and underutilization of hardware to support HART capabilities in case of non-HART device connections (traditional HART device). A switch controls the connection of a I/O channel to the modem and the modem has an inbuilt analog-digital converter (ADC) for sampling HART channels.

The embodiments herein also recognize and take into account that with a dedicated HART modem for each HART channel, there is an increase in the cost of I/O cards, underutilization of card capabilities if only few channels are used, and underutilization of hardware to support HART capabilities in case of non-HART device connections (traditional analog device). The modem has an inbuilt ADC for sampling HART channels.

Figure 3:
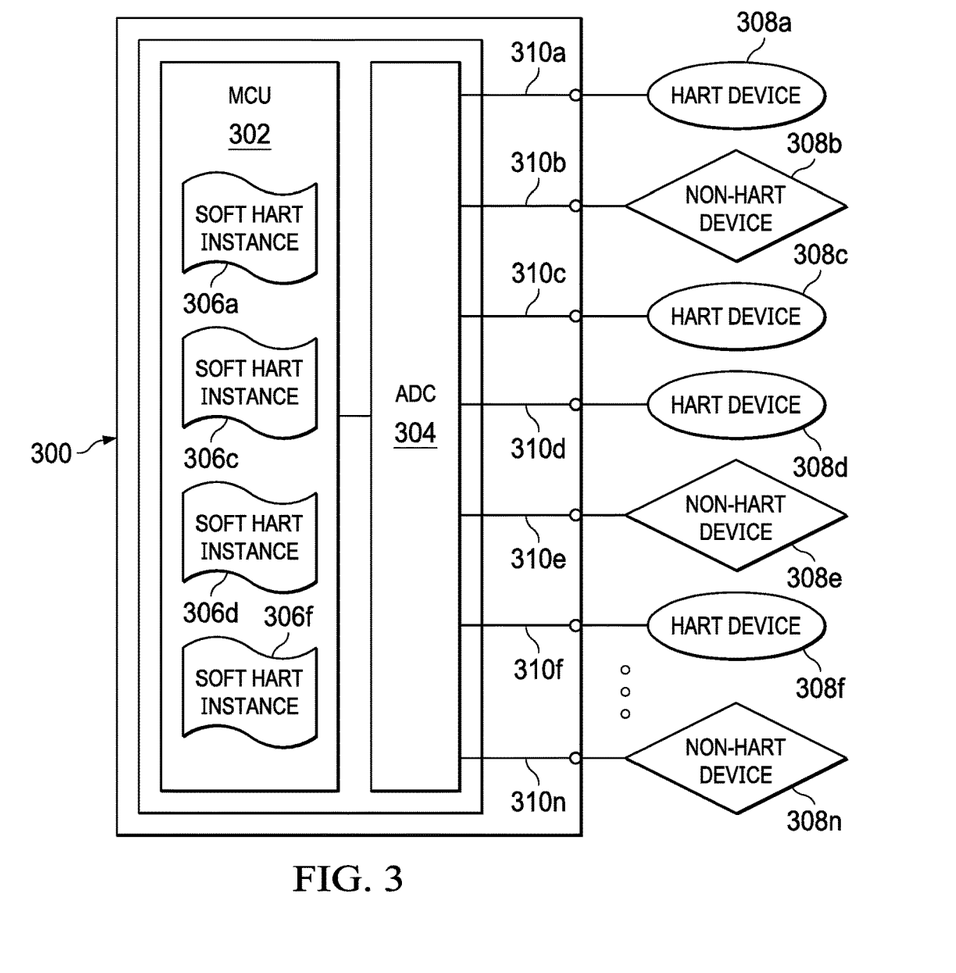
FIG. 3 illustrates an input/output (I/O) device in accordance with the embodiments.

FIG. 3 illustrates an input/output (I/O) device 300 according to the embodiments. The embodiment of the device 300 as shown in FIG. 3 is for illustration only. Other implementations could be used without departing from the scope of the embodiments.

In FIG. 3, device 300 may be one example of communications unit 206 as shown in FIG. 2. The device 300 includes include a multichannel unit (MCU) 302 and an analog-digital converter (ADC) 304. The device 300 may also include one or more soft HART instances 306a-306f for communication with devices 308a-308n.

Device 300 provides soft HART modem instances 306a-306f that are created dynamically based on active device connections to I/O lines 310a-310n in runtime. In one example embodiment, the device 300 only connects channels configured for HART or provides an associated soft HART modem instance 306a-306f in the MCU 302 on channels where HART devices 308a-308n are connected. In various embodiments, on disconnection of a device 308a-308n, the corresponding soft HART modem instance 306a-306f is terminated.

The ADC 304 may be a single or multiple high sampling rate ADC depending on the number of physical I/O channels on device 300. In one embodiment, device 300 is a System-on-chip (SoC) with an integrated ADC 304 and MCU 302. In different embodiments, the soft HART instances 306a-306f are firmware, software, or a combination thereof.

Device 300 provides for no underutilization of card capabilities as the number of HART modem instances depends on HART channels connected. There is no restriction on HART channels that can be used in parallel, which results in faster data exchange. There is also no underutilization of available hardware due to connection of a non-HART device.

Although FIG. 3 illustrates an example I/O device 300, various changes may be made to FIG. 3. For example, various components in FIG. 3 could be combined, further subdivided, or omitted and additional components could be added according to particular needs. Also, I/O devices can come in a wide variety of configurations, and FIG. 3 does not limit this disclosure to any particular configuration of an I/O device.

Figure 4:
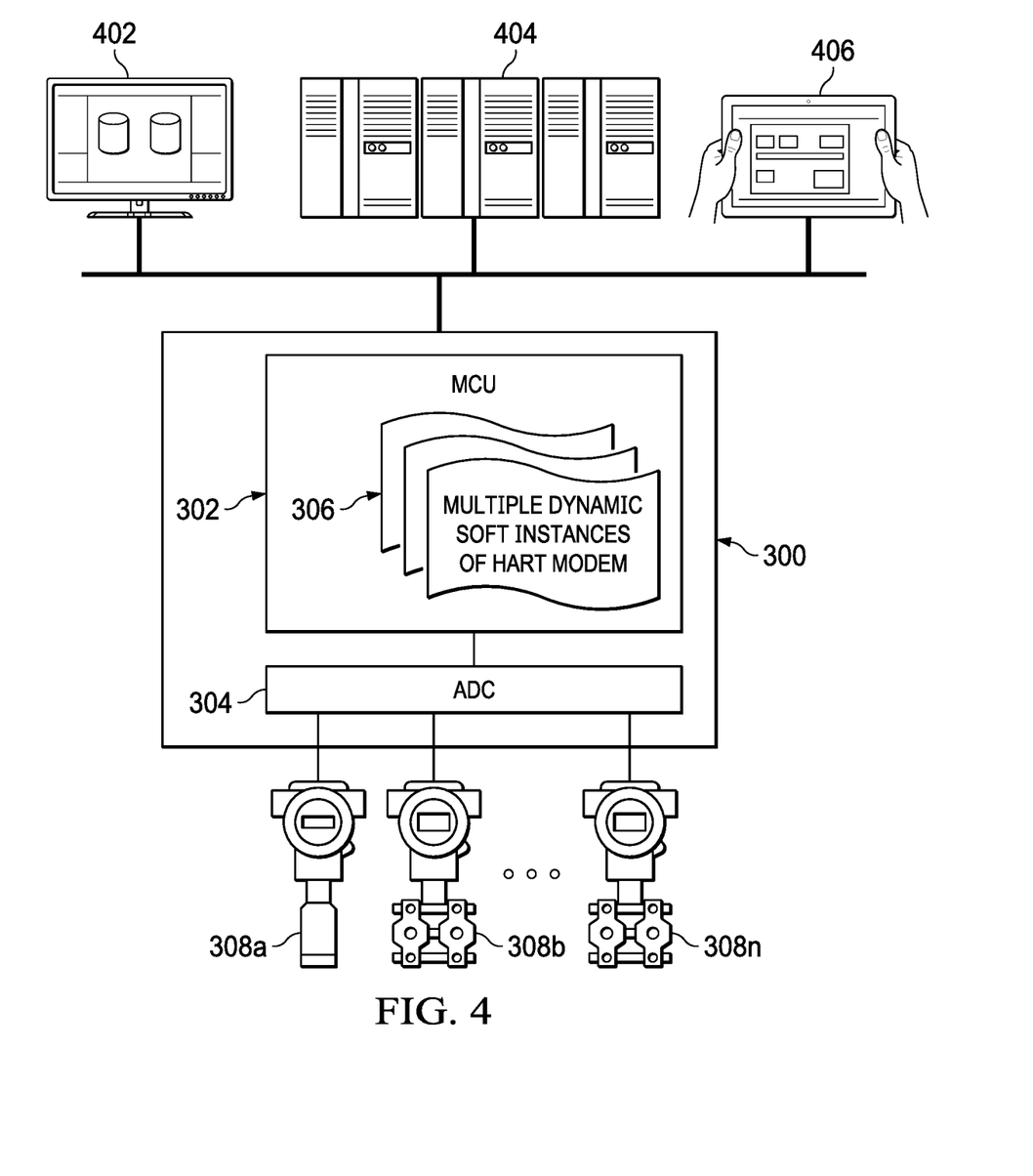
FIG. 4 illustrates a system using the soft HART instances according to the embodiments.

FIG. 4 illustrates a system 400 using the soft HART instances according to an embodiment. The embodiments of the system 400 shown in FIG. 4 are for illustration only. Other embodiments could be used without departing from the scope of the embodiments.

In the system 400, device 300 is able to detect the HART field transmitter/device 308a-308n connected to the I/O channels of the I/O card or recorder, instantiate soft HART modem instances 306a-306f dynamically based on the number of field transmitters or devices 308a-308n connected, create multiple soft HART modem instances 306a-306f through software running on the MCU 302 in the device 300, and terminate the soft HART modem instance 306a-306f when the field transmitter/device 308a-308n is taken out of network or if the host does not need HART data.

In one or more embodiments, the host may be a supervisory control and data acquisition (SCADA) data logger 402, programmable logic controller (PLC) 404, or distributed control system (DCS). A user may also interact with the HART data through a human-machine interface (HMI) such as a tablet, computer, etc.

Figure 5:
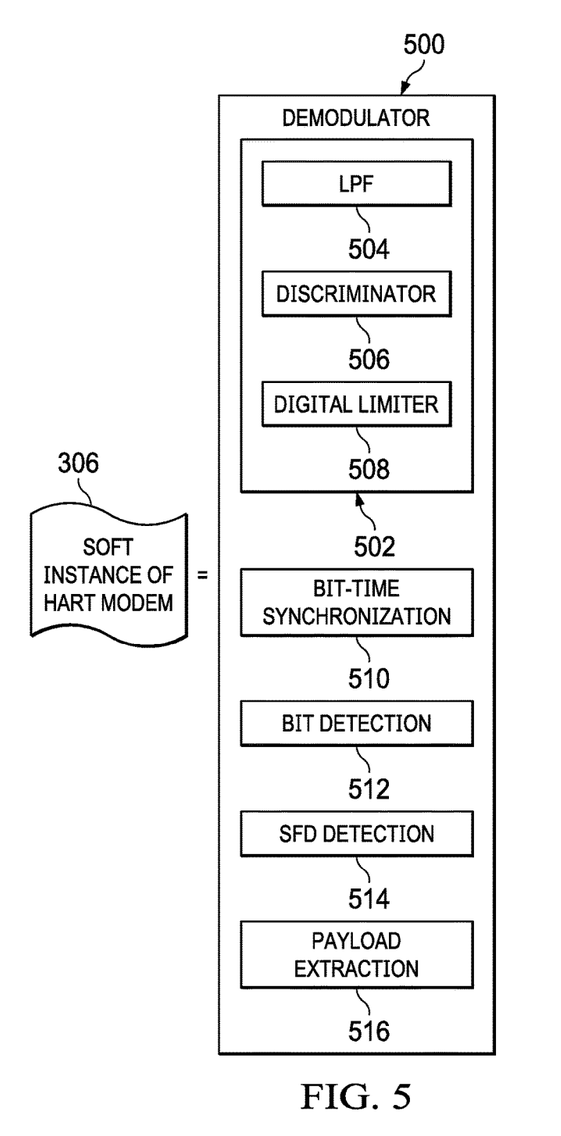
FIG. 5 illustrates a soft HART modem receiver instance system according to the embodiments.

FIG. 5 illustrates a soft HART modem instance system 500 according to an embodiment of. The embodiments of the system 500 shown in FIG. 5 are for illustration only. Other embodiments could be used without departing from the scope of the embodiments.

System 500 can be implemented as part of device 300. The system 500 can receive data being streamed from a sensor or actuator. The system 500 uses a demodulator 502, including a low pass filter (LPF) 504, discriminator 506, and digital limiter 508.

The demodulator 502, can be in one example, a circuit that is used in amplitude modulation and frequency modulation receivers in order to separate the information that was modulated onto the carrier from the carrier. The LPF 504 can be a filter that passes signals with a frequency lower than a certain cutoff frequency and attenuate signals with frequencies higher than the cutoff frequency. The discriminator 506 can be used to convert frequency changes into amplitude changes. The digital limiter 508 can be a circuit that allows signals below a specified input power or level to pass unaffected while attenuating (lowering) the peaks of stronger signals that exceed this threshold.

The system 500 also applies bit-time synchronization unit 510, bit detection unit 512, start frame delimiter (SFD) detection unit 514, and payload extraction unit 516. These units and modules are used to implement a soft HART modem instance in device 300. The different components in FIG. 5 can be implemented as hardware, software, or a combination thereof. Different components 502-516 can be analog and/or digital components.

Figure 6:
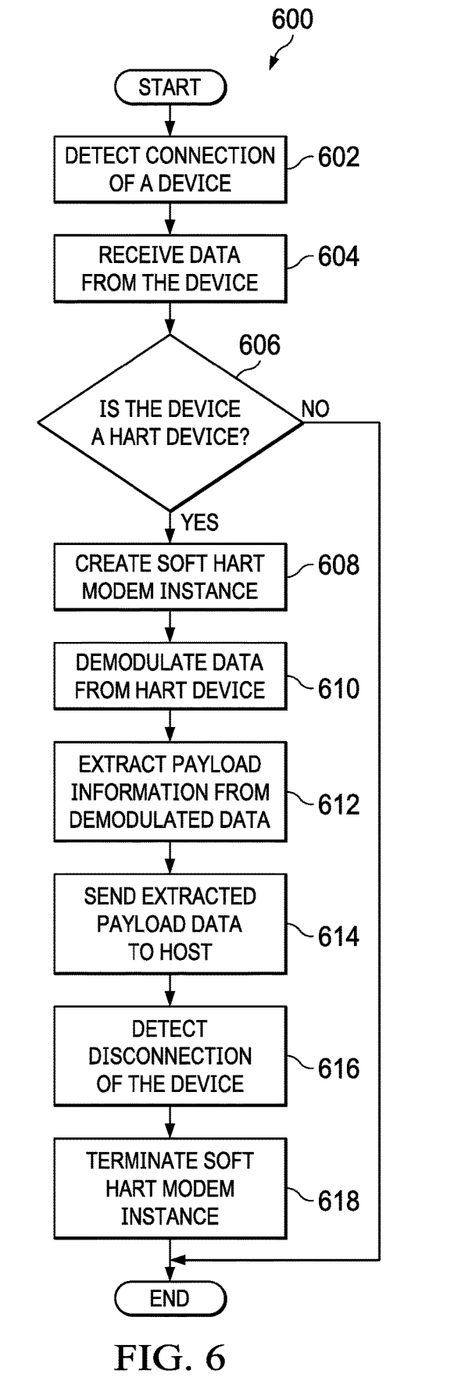
FIG. 6 illustrates an example process for managing of a soft HART modem receiver instance according to the embodiments.

FIG. 6 illustrates an example process 600 for managing of a soft HART modem instance according to an embodiment. A processing device, such as a controller, processor, or processing circuitry, can implement different operations in FIG. 6. The process 600 can be implemented in a device 300 shown in FIG. 3.

At step 602, an MCU of device 300 detects a connection of a field device to an ADC. The field device can be a sensor or actuator and can include a field transmitter. In one embodiment, the connection can be a 4-wire electrical signal network connection.

At step 604, the MCU receives data from the field device through the ADC. At step 606, the MCU determines whether the field device is a HART device or a non-HART device. A field device is a HART device if the field device is using HART protocol for communication. If the field device is not a HART device, then the process 600 ends. The MCU may forward the data from the non-HART devices without extracting a payload or the MCU may not accept or forward the data received from the non-HART devices. The MCU may detect the HART protocol by identifying a flag or set of bits in the data stream specific to the HART protocol or indicating the HART protocol.

If the device is a HART device, then at step 608 the MCU creates a soft HART modem instance. The soft HART modem instance can be created through the use of firmware, software, or combination thereof.

At step 610, the MCU, using the soft HART modem instance, demodulates the data received from the HART device. At step 612, payload information is extracted from the demodulated data. At step 614, the extracted payload information is sent to a host device.

At step 616, the MCU detects a disconnection of the field device from the MCU (or ADC). At step 618, the MCU terminates the soft HART modem instance corresponding to the disconnected field device.

Although FIG. 6 illustrates one example of a process 600 for managing of a soft HART modem instance, various changes may be made to FIG. 6. For example, while FIG. 6 shows a series of steps, various steps could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While certain embodiments and generally associated methods have been described herein, alterations and permutations of these embodiments and methods will be apparent to those skilled in the art. Accordingly, the above description of example embodiments does not define or constrain the embodiments. Other changes, substitutions, and alterations are also possible without departing from the spirit and scope of the embodiments, as defined by the following claims.

The invention claimed is:

1. A method for managing a device on a network, the method comprising:
   detecting, at a processing device comprising a multichannel unit, a connection of field devices comprising at least one of a sensor and an actuator in an industrial process control and automation system, wherein the field devices include one or more field transmitters;
   receiving data, from the field devices, including payload information related to the field devices in the industrial process control and automation system;
   determining, at the processing device, whether the field devices use a specific protocol based on the data;
   responsive to determining that the field devices uses the specific protocol, generating, at the processing device, one or more soft modem instances dynamically based on a number of the one or more field transmitters connected to I/O channels of the multichannel unit, wherein the dynamically generated one or more soft modem instances comprise at least one of virtual, software or firmware based modems that modulate or demodulate the data, and wherein the number of the dynamically generated one or more soft modem instances is associated with active device connections of the one or more field transmitters to I/O lines in runtime; and
   demodulating and extracting, using the dynamically generated one or more soft modem instances, the payload information from the data.

2. The method of claim 1, wherein the specific protocol is a Highway Addressable Remote Transducer (HART) protocol.

3. The method of claim 1, further comprising transmitting the extracted payload information to a host device.

4. The method of claim 1, wherein detecting the connection comprises detecting a connection of the field device to a field input/output (I/O) device, programmable logic controller (PLC) with I/O capabilities, distributed control system (DCS) with I/O capabilities, or supervisory control and data acquisition (SCADA) with I/O capabilities.

5. The method of claim 4, wherein the data is received via an analog to digital converter.

6. The method of claim 1, further comprising forwarding data from field devices, which are not using the specific protocol, to a host device without demodulation and extraction of the data from the field devices, which are not using the specific protocol.

7. The method of claim 1, further comprising, responsive to disconnection of the field device, terminating the dynamically generated one or more soft modem instances.

8. An apparatus, comprising:
   a memory configured to store data;
   a processing device coupled to the memory, the processing device comprising a multichannel unit and configured to:
      detect, at the processing device, a connection of field devices comprising at least one of a sensor and an actuator in an industrial process control and automation system, wherein the field devices include one or more field transmitters;
      receive the data, from the field devices, including payload information related to the field devices in the industrial process control and automation system;
      determine whether the field devices use a specific protocol based on the data;
      responsive to determining that the field devices uses the specific protocol, generate one or more soft modem instances dynamically based on a number of the one or more field transmitters connected to I/O channels of the multichannel unit, wherein the dynamically generated one or more soft modem instances comprise at least one of virtual, software, or firmware based modems that modulate or demodulate the data, and wherein the number of the dynamically generated one or more soft modem instances is associated with active device connections of the one or more field transmitters to I/O lines in runtime; and
      demodulate and extract, using the dynamically generated one or more soft modem instances, the payload information from the data.

9. The apparatus of claim 8, wherein the specific protocol is a Highway Addressable Remote Transducer (HART) protocol.

10. The apparatus of claim 8, wherein the processing device is further configured to transmit the extracted payload information to a host device.

11. The apparatus of claim 8, wherein detecting the connection comprises detecting a connection of the field device to a field input/output (I/O) device, programmable logic controller (PLC) with I/O capabilities, distributed control system (DCS) with I/O capabilities, or supervisory control and data acquisition (SCADA) with I/O capabilities.

12. The apparatus of claim 11, wherein the data is received via an analog to digital converter.

13. The apparatus of claim 8, wherein the processing device is further configured to forward data from field devices, which are not using the specific protocol, to a host device without demodulation and extraction of the data from the field devices, which are not using the specific protocol.

14. The apparatus of claim 8, wherein the processing device is further configured to, responsive to disconnection of the field device, terminate the dynamically generated one or more soft modem instances.

15. A non-transitory computer readable medium, the non-transitory computer readable medium comprising instructions that, when executed, cause a processing device to:
   detect, at the processing device comprising a multichannel unit, a connection of field devices comprising at least one of a sensor and an actuator in an industrial process control and automation system, wherein the field devices include one or more field transmitters;
   receive data, from the field devices, including payload information related to the field devices in the industrial process control and automation system;
   determine, at the processing device, whether the field devices use a specific protocol based on the data;
   responsive to determining that the field devices uses the specific protocol, generate, at the processing device, one or more soft modem instances dynamically based on a number of the one or more field transmitters connected to I/O channels of the multichannel unit, wherein the dynamically generated one or more soft modem instances comprise at least one of virtual, software, or firmware based modems that modulate or demodulate the data, and wherein the number of the dynamically generated one or more soft modem instances is associated with active device connections of the one or more field transmitters to I/O lines in runtime; and
   demodulate and extract, using the dynamically generated one or more soft modem instances, the payload information from the data.

16. The non-transitory computer readable medium of claim 15, wherein the specific protocol is a Highway Addressable Remote Transducer (HART) protocol.

17. The non-transitory computer readable medium of claim 15, wherein the instructions further cause the processing device to transmit the extracted payload information to a host device.

18. The non-transitory computer readable medium of claim 15, wherein detecting the connection comprises detecting a connection of the field device to a field input/output (I/O) device, programmable logic controller (PLC) with I/O capabilities, distributed control system (DCS) with I/O capabilities, or supervisory control and data acquisition (SCADA) with I/O capabilities.

19. The non-transitory computer readable medium of claim 18, wherein the data is received via an analog to digital converter.

20. The non-transitory computer readable medium of claim 15, wherein the instructions further cause the processing device to forward data from field devices, which are not using the specific protocol, to a host device without demodulation and extraction of the data from the field devices, which are not using the specific protocol.

* * * * *